F. M. Gardner,
Clod Fender.
No. 95,670. Patented Oct. 12, 1869.
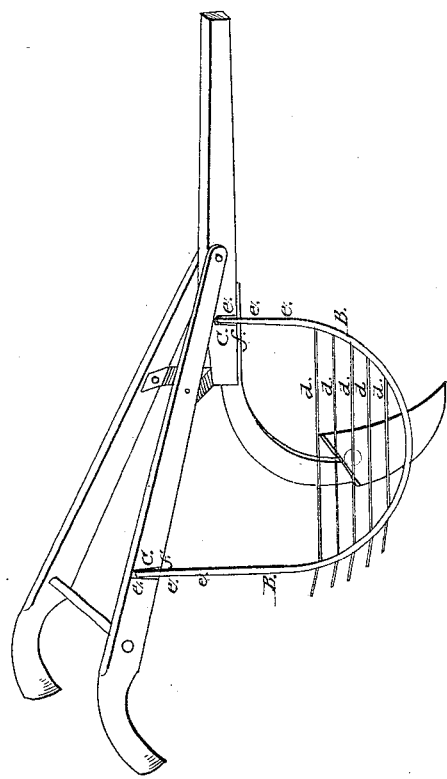
Witnesses:
John Adams
Abel Hart.
Inventor:
Francis M. Gardner.

UNITED STATES PATENT OFFICE.

FRANCIS M. GARDNER, OF BROWN TOWNSHIP, KNOX COUNTY, OHIO.

IMPROVEMENT IN CLOD-FENDERS.

Specification forming part of Letters Patent No. 95,676, dated October 12, 1869.

*To all whom it may concern:*

Be it known that I, FRANCIS M. GARDNER, of Brown township, in the county of Knox and State of Ohio, have invented a new and useful Improvement on Machines now in use for Preventing Plows and Cultivators from Throwing Clods and Stones on the crop cultivated; and I do hereby declare that the following is a full and exact description thereof, reference being had to the accompanying drawings of the same, with the letters of reference marked thereon.

The nature of my invention consists in providing plows and cultivators with a guard of wires or other suitable metal to prevent clods and stones from being thrown on the crop while cultivating it.

To enable others to make and use my invention, I will proceed to describe its construction and operation.

I construct my cultivator-guard (my invention above mentioned) by bending a bar of iron of suitable breadth and thickness into an arc of a circle, B. I fasten one end of this iron bar, thus bent, to the beams of plows or frames of cultivators before the shovels or mold-boards by a bolt, C, passed through the beam and the end of the iron bar. The other end I fasten to the handles or frames of plows and cultivators behind the mold-boards or shovels, likewise by a bolt, C, passed through the handle and the other end of the iron bar. Through holes made in this iron bar thus bent I pass small iron rods or wires *d d d d*, horizontally and close enough together to prevent clods and stones from passing between them. These rods are riveted in the bar before the shovels or mold-boards, but continued at pleasure through the bar behind the shovels and mold-boards, and bent in toward the furrow behind, so as to carry the clods and stones back into the furrow behind the plow or cultivator.

The guard made as above set forth can be raised or lowered at pleasure by means of holes *e e e e* in the ends of the bar, and can be set out from the edge of the shovels or mold-boards at pleasure by means of a wedge, *f*, between the bar and the beam.

In operating with this guard when the crop cultivated is small I let down the guard so that the iron bar runs even with the surface of the ground and close to the corn or other crop cultivated. By this means the soil falls alongside of the corn, &c., without covering it, and the clods and stones are carried back into the furrow behind the plow or other cultivator. As the crop gets larger I raise the guard, so as to let the soil fall around the corn or other crop cultivated at pleasure, the rough ground and stones being carried back into the furrow behind. The iron bar bent into a curve enables it to overcome obstructions in the ground cultivated and keeps it from being broken in meeting with stones or other obstructions, and at the same time it forms a strong frame for the iron rods or wires forming the guard, and keeps them in their place and prevents them from being broken or bent.

The machines now in use for the purpose of protecting the crop cultivated have but one end of the rods fastened into a bar, and the bar has no curve and is liable to be broken by obstructions and the rods to be bent or broken by obstructions and by the weight of the soil thrown from the plow.

I hereby disclaim all inventions now in use, as well as the manner of making the same now used for the purpose of protecting cultivated crops.

What I claim as my invention, and desire to secure by Letters Patent, is—

The mode of constructing and manner of attaching a guard or clod-fender to a plow or cultivator as shown and described.

FRANCIS M. GARDNER.

Witnesses:
JOHN ADAMS,
ABEL HART.